United States Patent [19]

Langlois, Jr. et al.

[11] Patent Number: 5,258,224
[45] Date of Patent: Nov. 2, 1993

[54] PRECERAMIC COMPOSITION AND CERAMIC PRODUCT

[75] Inventors: Conrad J. Langlois, Jr., New Roads; Genevieve S. Lum, Clinton, both of La.

[73] Assignee: Ethyl Corporation, Richmond, Va.

[21] Appl. No.: 597,063

[22] Filed: Oct. 15, 1990

[51] Int. Cl.$^5$ ............................................. B32B 18/00
[52] U.S. Cl. ..................................... 428/325; 428/446; 428/697; 428/698; 428/408; 524/428; 524/439; 501/98
[58] Field of Search ............... 501/96, 97, 88, 98; 428/447, 408, 698, 697, 446, 325; 556/402, 403; 106/287.11, 287.19, 287.23; 528/8.13; 524/428, 439

[56] References Cited

U.S. PATENT DOCUMENTS

| | | | |
|---|---|---|---|
| 4,482,669 | 11/1984 | Seyferth et al. | 524/422 |
| 4,942,011 | 7/1990 | Bolt et al. | 264/29.2 |
| 5,006,492 | 4/1991 | Semen et al. | 501/97 |
| 5,009,961 | 4/1991 | Niebylski | 428/446 |
| 5,041,337 | 8/1991 | Niebylski | 428/446 |
| 5,073,330 | 12/1991 | Nishio et al. | 264/535 |

Primary Examiner—Donald P. Walsh
Assistant Examiner—Ngoclan T. Mai
Attorney, Agent, or Firm—Patricia J. Hogan

[57] ABSTRACT

Preceramic compositions which have particular utility in providing protective ceramic coatings on normally oxidizable materials, such as carbon/carbon and other carbon-containing composites and other materials, are obtained by dispersing solid particles comprising aluminum nitride particles in an organic solvent solution of a polysilazane. Ceramic coatings derived from the dispersions may serve as intermediate strata in multilayer ceramic coatings over substrates, such as carbon/carbon composites, to provide even greater protection to the substrates, even when exposed to humidity.

9 Claims, No Drawings

PRECERAMIC COMPOSITION AND CERAMIC PRODUCT

FIELD OF INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals have properties which make them attractive for use in aerospace and other applications in which their susceptibility to oxidative deterioration at elevated temperatures is a serious disadvantage.

As disclosed in Niebylski's copending U.S. patent applications Ser. No. 261,612, filed Oct. 24, 1988, U.S. Pat. No. 272,258, filed Nov. 17, 1988, U.S. Pat. No. 414,463, filed Sep. 29, 1989, U.S. Pat. No. 415,653, filed Oct. 2, 1989, and U.S. Pat. No. 466,622, filed Jan. 17, 1990, such normally oxidizable materials can be protected from this oxidative deterioration by providing them with ceramic coatings derived from dispersions of certain solids, such as silicon carbide, metal borides, aluminum-silicon eutectic, or silicon metal, in polysilazane solutions.

The utility of the aforementioned coating compositions in forming one or more of the strata of multilayer ceramic coatings on normally oxidizable substrates, such as carbon/carbon composites, is taught in copending U.S. patent applications Ser. No. 446,184 (Niebylski), filed Dec. 5, 1989, and U.S. Pat. No. 466,225 (Niebylski et al.) and U.S. Pat. No. 466,594 (Niebylski), both filed Jan. 17, 1990. In the former two of these applications, it is also taught that, although cracking is apt to occur when ceramic layers derived from polysilazane compositions are applied over ceramic layers derived from organoborosilazane polymer compositions, the cracking tendency can be minimized by the use between those different layers of a buffer layer derived from a composition comprising as the essential components a Group IIIb metal hydrocarbyloxide, a Group IVa metal hydrocarbyloxide, a (dialkylamino)metal of Group IVa, and a polysilazane and/or (dialkylamino)silane.

SUMMARY OF INVENTION

It has now been found that novel compositions capable of providing protective ceramic coatings on normally oxidizable substrates can be obtained by dispersing solid particles comprising aluminum nitride particles in an organic solvent solution of a polysilazane.

It has also been found that ceramic coatings derived from these novel compositions, especially those in which the aluminum nitride particles are used in admixture with other solid particles, such as silicon metal particles, are particularly useful as at least one of the layers in multilayer ceramic coatings on normally oxidizable composites, such as carbon/carbon composites. These multilayer coatings provide greater protection to the composites from deterioration by oxidation and humidity or other moisture than comparable multilayer ceramic coatings in which the same layer is derived from a polysilazane dispersion which is comparable to the dispersions of the invention except for containing no aluminum nitride particles.

DETAILED DESCRIPTION

The polysilazane used in the practice of the invention may be any polysilazane that is soluble in common organic solvents, such as aliphatic or aromatic hydrocarbons or dialkyl or alicyclic ethers; and it may be, e.g., one or more polysilazanes of any of U.S. Pat. No. 4,397,828 (Seyferth et al.-I), U.S. Pat. No. 4,482,669 (Seyferth et al.-II), U.S. Pat. No. 4,645,807 (Seyferth et al.-III), U.S. Pat. No. 4,650,837 (Seyferth et al.-IV), and U.S. Pat. No. 4,659,850 (Arai et al.), the teachings of all of which are incorporated herein in toto by reference.

The preferred polysilazanes are those of the type taught by Seyferth et al.-II, i.e., silazane polymers or mixtures of silazane polymers obtained by reacting an organodihalosilane, such as methyldichlorosilane, with ammonia and polymerizing the ammonolysis product with a basic catalyst, such as potassium hydride. The basic catalyst effects polymerization by deprotonating NH groups that are adjacent to SiH groups; and, as is known, the polymerization product is quenched with an electrophilic quenching reagent, such as methyl iodide or dimethylchlorosilane, at the end of the reaction.

The solvent employed for the polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; 1,2-dimethoxyethane, bis(2-methoxyethyl) ether, and other ethers; and mixtures thereof. The amount used is generally such that the polysilazane solutions have solids contents of 5-75% by weight, preferably 30-50% by weight.

The solid particles dispersed in the polysilazane solutions are preferably powders having an average particle size of about 1-40 micrometers, those having the smaller particle sizes being easier to disperse. The amount of solid particles employed is preferably such that they constitute about 15-60% of the weight of the dispersion.

In the practice of the invention, it is essential that at least some of the solid particles be aluminum nitride particles; and it is generally preferred that the aluminum nitride particles constitute at least about 10% of the total weight of the solid particles. In some cases, it can be preferred for all of the solid particles dispersed in the polymer solutions to be aluminum nitride particles. However, in the embodiment of the invention in which the dispersions are used to form strata of multilayer ceramic coatings on composites, such as carbon/carbon composites, it has been found desirable to employ the aluminum nitride particles in admixture with other solid particles.

When other solid particles are used in admixture with the aluminum nitride particles, they may be particles of one or more of any suitable ceramic and preceramic materials, such as aluminum-silicon eutectic; silicon metal; silicon carbide; silicon nitride; and metal borides, such as the borides of silicon, hafnium, titanium, niobium, zirconium, and the rare earth metals. In one embodiment of the invention, it is preferred to use silicon metal particles, preferably amorphous silicon metal powder, in admixture with the aluminum nitride particles so that the mixture contains 40-60% by weight of each type of particle.

The polysilazane dispersions of the invention are preceramic materials which are useful for making ceramics such as coatings and structural composites; and, like other preceramic materials, they may be used in combination with other ingredients, such as ceramic powders or whiskers, when appropriate.

The dispersions are converted to ceramics by driving off the solvent at a temperature dependent on the boiling point of the solvent and heating the residue at about 675°–925° C., preferably about 825°–875° C., to pyrolyze it, the time required for pyrolysis generally being about 1–60 minutes, depending on the particular pyrolysis temperature selected. After the ceramic has been formed, it may be thermally treated at about 1075°–1350.C., preferably about 1100°–1175° C., most preferably about 1125° C., in an atmosphere containing not more than a minor amount of oxygen to make it more homogeneous.

An application in which the dispersions find particular utility is as coating compositions for normally oxidizable materials, especially those which need protection from oxidative deterioration at elevated temperatures. The normally oxidizable materials which can be protected by the use of the dispersions include, e.g., fibers, tows, hanks, mats, and composites of carbon (including carbon fiber/carbon matrix composites, carbon fiber/silicon carbide matrix composites, and carbon-coated silicon carbide fiber/silicon carbide matrix composites); carbon or graphite slabs, rods, and structures; and oxidizable metals, such as magnesium, aluminum, silicon, niobium, molybdenum, lanthanum, hafnium, tantalum, tungsten, titanium, and the metals of the lanthanide and actinide series.

When the dispersions are to be used to provide protective ceramic coatings on substrates, the surfaces to be coated are usually cleaned prior to the application of the coating composition, and sometimes also etched and/or primed, to improve the bonding of the ceramic coating thereto.

A particularly useful primer composition for use in this regard is a composition comprising (A) about 99–95 parts by weight of a trialkoxy-, triaryloxy-, or tri(arylalkoxy)boroxine, (B) respectively about 1–5 parts by weight of an anhydrous acid selected from HF and HNO₃, (C) a non-aqueous vehicle for the acid, and (D) optionally a solvent for the boroxine.

The boroxine component of this type of primer composition is preferably a trialkoxy-, triphenoxy-, tri(alkoxyphenoxy)-, tri(phenalkoxy)-, or tri(alkylphenalkoxy)boroxine in which any alkyl or alkoxy group contains 1–6 carbons, such as the trimethoxy-, triethoxy-, tripropoxy-, tributoxy-, tripentoxy, trihexoxy-, triphenoxy-, tritolyloxy, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, and tritolylethoxyboroxine. It is most preferably trimethoxyboroxine.

The anhydrous acid, which is included in the primer to etch the surface of the substrate and thus improve adhesion of the coating, is preferably HF and is incorporated into the composition in any suitable non-aqueous vehicle, such as methanol, ethanol, isopropanol, pyridine, or other solvent. Because of their commercial availability, anhydrous HF-ethanol and HF-pyridine are apt to be preferred sources of the acid and vehicle.

When the boroxine is sufficiently low-melting, it is not necessary for the composition to contain a solvent for the boroxine. However, when the boroxine is too high-melting to be easily applied, and optionally even when the boroxine is low-melting, the composition usually contains a solvent for the boroxine, e.g., an aliphatic hydrocarbon, such as hexane, heptane, etc.; an aromatic hydrocarbon, such as benzene, toluene, xylene, etc.; a non-hydrocarbon solvent, such as methanol, ethanol, cyclohexanone, 1-methylpyrrolidone, etc.; other solvents having boiling points not higher than about 250° C.; and mixtures of such solvents.

The primer composition may be applied to the substrate in any suitable manner, such as by dipping, spraying, swabbing, or brushing, to form a coating having the desired thickness, generally a thickness of about 0.5–15 micrometers. When the desired thickness has been deposited, the coating can then be solidified and adhered to the substrate by heating it at about 100°–250° C.

The preceramic coating compositions may be applied to the optionally primed substrates in any suitable manner, such as by spraying, swabbing, or brushing, to form coatings having the desired thickness, generally a thickness of up to about 1000 micrometers, and then driving off the solvent. When relatively thick coatings are desired, it is apt to be preferred to attain the desired thickness by applying the coating composition in multiple thinner layers, e.g., layers of 25–100 micrometers, each of which is dried before the next layer is applied.

Pyrolysis of the dried coating may be delayed until the final desired thickness has been deposited. However, when the coating is applied in multiple layers, it is generally preferred to pyrolyze each one or two layers before the application of the next. In this embodiment of the invention, when the pyrolysis temperature is about 825°–875° C., it has been found satisfactory to pyrolyze the first coat for only about five minutes and then to pyrolyze subsequent coats for longer times up to about 15 minutes.

In the coating of substrates it is particularly desirable to employ the post-pyrolysis thermal treatment mentioned above in order to make the coats more homogeneous. This treatment may be accomplished by raising the temperature in the vessel used for the pyrolysis or by transferring the coated substrate to a vessel maintained at the higher temperature; and it is preferably continued for at least about five minutes.

After being heated for a suitable time, the coated substrate is cooled to provide an article which has greater resistance to oxidative deterioration than the uncoated substrate.

When a multilayer coating is desired, as in the embodiment of the invention mentioned earlier, it is sometimes desirable to overcoat the first ceramic layer derived from a particular type of preceramic composition with one or more ceramic coats derived from the same type of composition before providing a ceramic overcoat derived from a different type of preceramic composition. Thus, in the subsequent disclosure of multilayer coatings, it should be understood that the provision of a ceramic coat from a particular type of coating composition implies the provision of one or more coats from that type of composition prior to the application of any different type of coating composition.

As already mentioned, a preferred embodiment of the invention is the use of the dispersions in forming one or more of the strata of a multilayer ceramic coating on a carbon/carbon composite. In this embodiment, the optionally-primed carbon/ carbon composite is successively coated with (A) an organoborosilazane polymer solution, (B) an organoborosilazane polymer dispersion, (C) a buffer composition, (D) a polysilazane solution, (E) a dispersion of the invention, and (F) a polysilazane solution.

The organoborosilazane polymer solutions which can be used are those having a composition such that they are obtainable by reacting about 0.25-20 parts by weight of a trialkoxy-, triaryloxy-, or tri(arylalkoxy)-boroxine with one part by weight of a polysilazane in an organic solvent. These compositions are already known and are disclosed, e.g., in European Patent Application 0 325 483 (Niebylski).

In the preparation of these known organoborosilazane polymer compositions, the boroxines, polysilazanes, and organic solvents employed can be any of those mentioned above.

The organoborosilazane polymer solution is applied to the substrate, dried, and pyrolyzed to form a ceramic coating essentially by the process taught above for the preparation of ceramic coatings from the dispersions of the invention; and the ceramic coating is then optionally thickened by repeating the application, drying, and pyrolysis steps one or more times.

When the desired thickness of ceramic coating has been obtained from the organoborosilazane polymer solution, the coated substrate is overcoated with an organoborosilazane polymer dispersion of about 0-0.1 part by weight of a Group IIa metal salt and about 0.1-5.0 parts by weight of ceramic or preceramic solids in a 5-75% solids organic solvent solution of an organoborosilazane polymer, such as the solutions described above.

The ceramic or preceramic solids dispersed in the solutions may be any suitable solids, such as those taught above for inclusion in the dispersions of the invention. Group IIa metal salts which can be used include, e.g., the fluorides, tetrafluoroborates, oxides, oxyfluorides, oxynitrides, acetates, and benzoates of beryllium, magnesium, calcium, strontium, and barium; and the preferred salt is barium fluoride.

The provision of a ceramic layer from the organoborosilazane polymer dispersion is accomplished in essentially the same manner as the provision of the first ceramic layer except that each pyrolysis step used in the provision of this layer is preferably followed by a thermal treatment to make the coat more homogeneous, as in the above-described process for preparing ceramics from the dispersions of the invention.

The coating composition applied over the ceramic coat derived from the organoborosilazane polymer dispersion in this embodiment of the invention is a buffer composition. This composition is a dispersion of about 1-60% by weight of ceramic or preceramic solids in a solution of (1) a Group IIIb metal hydrocarbyloxide, (2) a Group IVa metal hydrocarbyloxide, (3) a bis-, tris-, or tetrakis(dialkylamino)metal of Group IVa, (4) a polysilazane and/or a bis-, tris-, or tetrakis(dialkylamino)silane, and (5) optionally a cyclopentadienyl Group IVa metal halide in an organic solvent, each of the first four ingredients constituting 1-50% of their combined weights, and the fifth ingredient constituting 0-20% of the combined weights of the five ingredients.

The Group IIIb and Group IVa metal hydrocarbyloxides utilized in the buffer composition may be any such compounds which can be dissolved in the organic solvent. Exemplary of such compounds are the aryloxides, such as phenoxides; and the alkoxides, especially those in which the alkoxy groups contain 1-6 carbons, such as the methoxides, ethoxides, n- and isopropoxides, n-, sec-, and t-butoxides, pentoxides, and hexoxides, of boron, aluminum, gallium, indium, thallium, titanium, zirconium, and hafnium. The preferred Group IIIb metal hydrocarbyloxide is aluminum sec-butoxide, and the preferred Group IVa metal hydrocarbyloxide is zirconium propoxide.

The bis-, tris-, or tetrakis(dialkylamino)metal is a compound of a Group IVa metal, i.e., titanium, zirconium, or hafnium, in which the alkyl groups contain 1-6 carbons. Exemplary of such compounds are tetrakis(dimethylamino)titanium, tetrakis(diethylamino)titanium, tetrakis(dipropylamino)titanium, tetrakis(dibutylamino)titanium, tetrakis(dipentylamino)titanium, tetrakis(dihexylamino)titanium, the corresponding tris(dialkylamino)titanium hydrides, the corresponding bis(dialkylamino)titanium hydrides, the corresponding zirconium and hafnium compounds, and mixtures thereof. The preferred compound is tetrakis(diethylamino)titanium.

The polysilazane which is sometimes used in the buffer composition may be any soluble polysilazane. However, like the polysilazanes mentioned above, it is preferably a polysilazane of the type taught by Seyferth et al.-II.

The bis-, tris-, or tetrakis(dialkylamino)silane which is used instead of or together with the polysilazane is a compound in which the alkyl groups contain 1-6 carbons. Such compounds include, e.g., tetrakis(dimethylamino)silane, tetrakis(diethylamino)silane, tetrakis(dipropylamino)silane, tetrakis(dibutylamino)silane, tetrakis(dipentylamino)silane, tetrakis(dihexylamino)silane, the corresponding tris- and bis(dialkylamino)silanes, and mixtures thereof. The preferred compound of this type is tetrakis(dimethylamino)silane.

The cyclopentadienyl Group IVa metal halide optionally employed is a compound corresponding to the formula $(C_5H_5)_n MH_m Xp$ wherein M is a Group IVa metal, i.e., titanium, zirconium, or hafnium; X is halo, i.e., fluoro, chloro, bromo, or iodo; m is 0, 1, or 2; p and n are integers of 1-3; and the sum of m, n, and p is 4. Exemplary of such compounds are cyclopentadientyl-hafnium trichloride, bis(byclopentadienyl)hafnium dichloride, tris(cyclopentadienyl)hafnium chloride, cyclopentadienylhafnium chloride dihydride, bis(cyclopentadienyl)hafnium chloride hydride, the corresponding zirconium and titanium compounds, the corresponding fluorides, bromides, and iodides, and mixtures thereof. The preferred compound is bis(cyclopentadienyl)zirconium dichloride.

When employed, the cyclopentadienyl compound generally constitutes not more than about 5% of the combined weights of the dissolved solids in the buffer composition. The (dialkylamino)metal of Group IVa is preferably used so as to constitute about 1-15% of the combined weights of the dissolved solids, and each of the other ingredients is preferably utilized in an amount such as to constitute about 20-30% of the combined weights of the dissolved solids.

The solvent employed for the buffer composition may be any suitable organic solvent, such as those mentioned above. Although the amount utilized is not critical, it is generally preferred to use an amount of solvent such as to provide a dissolved solids content of about 65-85% by weight.

The solids which are dispersed in the solution may be any of the preceramic or ceramic powders mentioned above, and they are generally employed in amounts such as to constitute about 15-60% by weight of the dispersions.

The buffer layer is applied and dried in essentially the same manner as the lower layers; and, if desired, it may be pyrolyzed prior to the application of the next different coating composition. However, since pyrolysis at this time does not appear to offer any advantages, the pyrolysis of the buffer layer is generally delayed so that it can be accomplished simultaneously with the pyrolysis of the next layer.

After the buffer layer has been provided, it is overcoated with a polysilazane solution having a solids content of 5–75%, preferably 30–50% by weight. This solution, in which the polysilazane and solvent can be any of those mentioned above, is applied and dried in essentially the same manner as the lower layers and is then pyrolyzed, generally together with the buffer layer, under essentially the same conditions as employed for the pyrolysis of the organoborosilazane polymer dispersion.

The coated substrate provided by the aforementioned procedures is overcoated with a dispersion of the invention, which is applied, dried, pyrolyzed, and preferably also subjected to a post-pyrolysis heat treatment as taught above.

When one or more ceramic layers derived from the polysilazane dispersion of the invention have been provided, the coated substrate is overcoated with a polysilazane solution. Solutions which may be used in this overcoating step may be any of the polysilazane solutions mentioned above; and they are applied, dried, and pyrolyzed in essentially the same manner as the compositions used in forming the lower layers.

The invention is advantageous in that it provides novel preceramic dispersions which can be dried and pyrolyzed to form ceramics in which at least some of the aluminum nitride particles remain discrete. As already mentioned, these ceramics find utility in a variety of applications but are particularly useful as coatings capable of protecting normally oxidizable materials from oxidative deterioration at elevated temperatures, even under high humidity conditions. When used as strata in multilayer ceramic coatings on carbon/carbon composites, they permit the attainment of superior oxidation resistance.

The following examples are given to illustrate the invention and are not intended as a limitation thereof. Unless otherwise indicated, quantities mentioned in these examples are quantities by weight. Materials used in the experiments described in the examples were:

T—a 40% solids solution in xylene of a polysilazane prepared by the potassium hydridecatalyzed polymerization of a methyldichlorosilane ammonolysis product TB-1—a 60% solution in bis(2-methoxyethyl) ether of the product obtained by adding a solution of trimethoxyboroxine in bis(2-methoxyethyl) ether to T in a boroxine/polysilazane ratio of 3.3/1 and allowing the boroxine and polysilazane to react TB-2—a 60% solution in bis(2-methoxyethyl) ether of the product obtained by adding a solution of trimethoxyboroxine in bis(2-methoxyethyl) ether to T in a boroxine/polysilazane ratio of 4/1 and allowing the boroxine and polysilazane to react TBS—a 45% dispersed solids dispersion of a 1/1/0.25 mixture of amorphous silicon metal, silicon hexaboride, and barium fluoride in TB-1

QS—a 20–35% dispersed solids dispersion of a 3/1 mixture of amorphous silicon metal powder and silicon tetraboride powder in a solution of 25 parts of zirconium propoxide, 25 parts of aluminum sec-butoxide, 25 parts of a polysilazane, and 12.5 parts of tetrakis(diethylamino)titanium in 37.5 parts of xylene.

EXAMPLE I

Add powders of amorphous silicon metal and aluminum nitride in a 1/1 ratio to the T solution in amounts such as to provide a mixture having an added solids content of 30–35%, and agitate the mixture to form a homogeneous dispersion designated as TS.

EXAMPLE II

Prime a carbon/carbon composite coupon containing an oxidation inhibitor with a primer composition obtained by mixing 3–5 cc of a 1.9 M solution of HF in ethanol, 3 cc of xylene, and 3 cc of isopropanol with 100 g of trimethoxyboroxine. Then solidify the primer.

Apply the TB-2 solution to the primed composite and drive off the solvent to provide a dried coating. Heat the coated substrate at 825°–875°–C. to pyrolyze the coating, cool, and then repeat the application, drying, pyrolysis, and cooling to provide a thicker ceramic coating.

Apply the TBS dispersion over the ceramic layer from TB-2, drive off the solvent, pyrolyze the dried coating at 825°–875° C., heat at 1100°–1175° C. to make the ceramic coating more homogeneous, cool, and then repeat the application, drying, pyrolysis, heat treatment, and cooling to provide a thicker ceramic coating.

Overcoat the ceramic coating from TBS by applying the QS dispersion, driving off the solvent, applying the T solution, drying, and then simultaneously pyrolyzing the preceramic QS and T compositions at 825°–875° C., 1125° C., and 1325° C.

After cooling the coated substrate, apply the TS dispersion over the ceramic layer from QS-T, dry, pyrolyze, heat-treat, cool, and then repeat the operation in the same manner as with the QS/T coating to provide a thicker ceramic coating.

Finally provide a topcoat by overcoating the ceramic layer from TS with the T solution, drying, converting the preceramic coating to a ceramic, cooling, and repeating the operation to form a thicker ceramic coating.

Test the effectiveness of the coating in protecting the substrate from oxidative deterioration at elevated temperatures and deterioration by exposure to moisture by (A) subjecting the coated coupon to a cycle of 30 minutes at 815° C., six minutes at 1425° C., 30 minutes at 815° C., and 43 minutes at room temperature, (B) repeating the cycle three more times, (C) heating for 16 hours at 650° C., (D) placing the coated coupon in a humidity chamber maintained at 96% relative humidity and a temperature of 35.5° C. for 24 hours, and (C) repeating the test until the weight loss is at least 2%.

The coupon of this example does not fail, i.e., show a weight loss of at least 2%, until 192 hours of humidity exposure. This is in contrast to a fail time of 72 hours of humidity when the same type of inhibited carbon/carbon composite coupon is provided with a comparable multilayer ceramic coating in which the TS-derived ceramic layer is replaced with a ceramic layer derived from a polysilazane dispersion in which the dispersed solids are a 1/1/0.5 mixture of amorphous silicon metal, silicon tetraboride, and silicon hexaboride instead of the 1/1 mixture of amorphous silicon metal and aluminum nitride.

What is claimed is:

1. A dispersion of solid particles in an organic solvent solution of a polysilazane, the solid particles being a mixture of 40-60% by weight of aluminum nitride particles and 60-40% by weight of silicon metal particles.

2. The dispersion of claim 1 wherein the solid particles constitute about 15-60% of the weight of the dispersion.

3. The dispersion of claim 1 wherein the solution in which the particles are dispersed is a 5-75% solids solution of a polysilazane which has been prepared by reacting an organodihalosilane with ammonia and polymerizing the ammonolysis product with a basic catalyst.

4. The dispersion of claim 3 wherein the solution in which the particles is dispersed is a 30-50% solids solution of a polysilazane which has been prepared by reacting methyldichlorosilane with ammonia and polymerizing the ammonolysis product with potassium hydride.

5. The dispersion of claim 4 wherein the mixture of solid particles constitutes about 15-60% of the weight of the dispersion.

6. An article which comprises a substrate that is normally susceptible to oxidative deterioration and a coating derivable from the dispersion of claim 1 by coating the substrate with the dispersion, driving off the solvent, heating the thus-dried coating at about 675°-925° C. to convert it to a ceramic, and optionally heating the ceramic coating thus formed at about 1075°-1350° C. to make it more homogeneous.

7. The article of claim 6 wherein the substrate is a carbon-containing composite.

8. The article of claim 6 wherein the solution in which the particles are dispersed is a 30-50% solids solution of a polysilazane which has been prepared by reacting methyldichlorosilane with ammonia and polymerizing the ammonolysis product with potassium hydride.

9. The article of claim 8 wherein the mixture of solid particles constitutes about 15-60% of the weight of the dispersion.

* * * * *